United States Patent
Maezawa et al.

(10) Patent No.: US 7,173,258 B2
(45) Date of Patent: Feb. 6, 2007

(54) RADIATION IMAGE CONVERSION PANEL AND PREPARATION METHOD THEREOF

(75) Inventors: Akihiro Maezawa, Hino (JP); Kuniaki Nakano, Uenohara-machi (JP); Osamu Morikawa, Hachioji (JP); Katsuya Kishinami, Hachioji (JP); Noriyuki Mishina, Ome (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 118 days.

(21) Appl. No.: 10/988,034

(22) Filed: Nov. 12, 2004

(65) Prior Publication Data

US 2005/0104010 A1    May 19, 2005

(30) Foreign Application Priority Data

Nov. 18, 2003  (JP)  .............................. 2003-387604
Nov. 18, 2003  (JP)  .............................. 2003-387605

(51) Int. Cl.
   *G03B 42/08*    (2006.01)
(52) U.S. Cl. .................................. 250/484.4
(58) Field of Classification Search .............. 250/484.4
   See application file for complete search history.

(56) References Cited

U.S. PATENT DOCUMENTS 3,859,527 A    1/1975   Luckey
4,947,046 A *  8/1990   Kawabata et al. ........ 250/484.4
5,098,610 A *  3/1992   Okamura et al. ........... 252/511
2002/0166977 A1* 11/2002 Kohda et al. ............. 250/484.4
2003/0160186 A1*  8/2003 Van den Bergh et al. ...................... 250/484.4

FOREIGN PATENT DOCUMENTS

| JP | 59-75200 A   | 4/1984 |
| JP | 61-072087 A  | 4/1986 |
| JP | 61-073786 A  | 4/1986 |
| JP | 61-073787 A  | 4/1986 |
| JP | 61-142497 A  | 6/1986 |
| JP | 61-142500 A  | 6/1986 |
| JP | 62-039737 A  | 2/1987 |
| JP | 62-110200 A  | 5/1987 |
| JP | 02-058000 A  | 2/1990 |

* cited by examiner

*Primary Examiner*—Constantine Hannaher
(74) *Attorney, Agent, or Firm*—Frishauf, Holtz, Goodman & Chick, P.C.

(57) ABSTRACT

A radiation image conversion panel exhibiting superior homogeneity of an activator in a phosphor layer and enhanced luminance and sharpness, and a preparation method of the same. Described is the radiation image conversion panel having a stimulable phosphor layer on a support. The stimulable phosphor layer is formed by a vapor-phase growth process so as to have a layer thickness of 50 μm to 1 mm after a thermoplastic resin film is prepared on the support or the stimulable phosphor layer mentioned above is formed on a support composed of a thermoplastic resin containing a carbon fiber.

7 Claims, 1 Drawing Sheet

RADIATION IMAGE CONVERSION PANEL AND PREPARATION METHOD THEREOF

TECHNICAL FIELD

The present invention relates to a radiation image conversion panel and a method for preparing the same.

BACKGROUND

Although so-called radiography employing silver halide photography is conventionally used to obtain radiographic images, there also has been developed a radiographic imaging method not using silver halide photographic material. Thus, an imaging method is disclosed, in which radiation that has been transmitted through an object is absorbed by phosphor, followed by exciting the phosphor with energy to cause a radiation energy accumulated in the phosphor to radiate in the form of fluorescence, and imaging is achieved by detecting the fluorescence.

Specifically, U.S. Pat. No. 3,859,527 discloses a radiation image conversion method, in which a panel having on a support a stimulable phosphor layer is employed using either or both visible light and infrared rays as the stimulating energy.

There have been developed radiation image conversion methods using a stimulable phosphor exhibiting enhanced luminance and high sensitivity, including, for example, a radiation image conversion method employing $BaFX:Eu^{2+}$ type phosphor (X: Cl, Br, I), as described in JP-A No. 59-75200 (hereinafter, the term, JP-A refers to Japanese Patent Application Publication); a radiation image conversion method employing an alkali halide phosphor, as described in JP-A No. 61-72087; a radiation image conversion method employing an alkali halide phosphor containing, as co-activators, $Tl^+$ and metals such as $Ce^{3+}$, $Sm^{3+}$, $Eu^{3+}$, $Y^{3+}$, $Ag^+$, $Mg^{2+}$, $Pb^{2+}$ or $In^{3+}$, as described in JP-A Nos. 61-73786 and 61-73787.

Recently, a radiation image conversion panel exhibiting further enhanced sharpness has been desired in the field of diagnostic image analysis. Of these, an attempt in controlling the form of stimulable phosphor grains to enhance sensitivity and sharpness was made as a means for improving sharpness of radiographic images.

For example, JP-A No. 61-142497 discloses a method of using a stimulable phosphor layer comprising a fine pseudo-columnar block which has been formed by sedimentation of a stimulable phosphor on a support having fine protruded patterns.

JP-A No. 61-142500 discloses a method of using a radiation image conversion panel having a developed stimulable phosphor layer by applying a shock treatment of cracks which appeared in columnar blocks formed by sedimentation of a stimulable phosphor on a support having fine patterns; JP-A No. 62-39737 discloses a method of using a radiation image conversion panel having a stimulable phosphor layer having a pseudo-columnar form which has been formed by producing cracks on the layer surface side; JP-A No. 62-110200 proposes a method in which a stimulable phosphor layer having voids is-formed by vapor deposition onto the upper surface of a support, followed by growing voids by subjecting a heating treatment to produce cracks.

JP-A No. 2-58000 proposed a radiation image conversion panel having a stimulable phosphor layer, in which long and thin columnar crystals were formed with an incline at a given angle toward the direction normal to the support.

In the foregoing attempts to control the form of a stimulable phosphor layer, it was intended to enhance image quality by allowing the phosphor layer to have a columnar crystal structure. It was supposed that the columnar form prevented traverse diffusion of stimulated emission light (or photo-stimulated luminescence), i.e., the light reached the support surface with repeating reflection at the interface of cracks (or columnar crystals), thereby leading to markedly enhanced sharpness of images formed by the stimulated luminescence.

Recently, a radiation image conversion panel using a stimulable phosphor containing an alkali halide such as CsBr as a basic substance and Eu as an activator, and the use of activator Eu leading to enhanced X-ray conversion efficiency, which has formerly not been achieved.

A desired, high X-ray conversion efficiency, however, can not be obtained and it is not put into practical use on the market, because there is a problem that Eu in a basic substance can not be diffused homogeneously because of the high vapor pressure under vacuum and the remarkable thermal diffusion of Eu.

But, the film formation with an evaporation technique is desired to prepare CsBr:Eu phosphor layer and a film thickness distribution can be achieved in a high degree of accuracy by accurately positioning a substrate and an evaporation source and properly arranging a physical position in order to control the film thickness distribution.

The evaporation method and homogeneity in the film influenced by the base material have become important, because there is a problem that Eu in a basic substrate can not be diffused homogeneously because of the high vapor pressure under vacuum and the remarkable thermal diffusion of Eu especially in CsBr:Eu.

A uniform adhesion between the base material and a phosphor layer is necessary for better performace obtained by having a thick film because of a large scale in area. Change in a degree of vacuum caused by generation of volatile ingredients at the time when a phosphor film is deposited results in inferiority in uniform thickness and inhomogeneity of the activator contained in the phosphor layer, because there are a lot of residual solvents and volatile ingredients, depending on a manufacturing process of a resin, in the case of the resin prepared on a surface of the base material.

SUMMARY

It is an object of the present invention to provide a radiation image conversion panel exhibiting superior homogeneity of an activator in a phosphor layer and enhanced luminance and sharpness, and a preparation method of the same.

DESCRIPTION OF THE PREFERRED EMBODIMENTS

Figure 1:
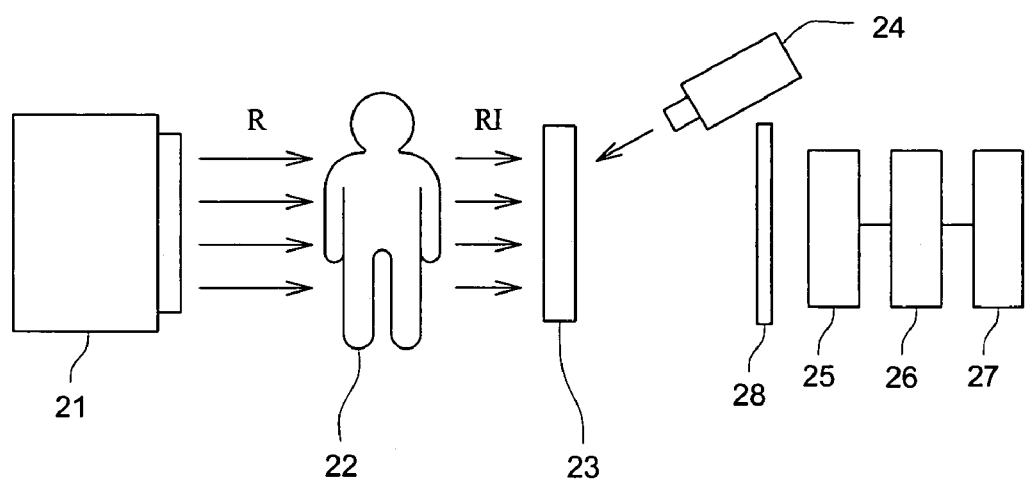
FIG. 1 shows constitution of a radiation image conversion panel according to the invention.

The foregoing object can be accomplished by the following constitution.

(Structure 1) A radiation image conversion panel having on a support a stimulable phosphor layer, wherein the stimulable phosphor layer possesses columnar crystals of a stimulable phosphor and has a thickness of 50 μm to 1 mm, and the support has thereon a thermoplastic resin layer or is composed of a thermoplastic resin containing a carbon fiber.

(Structure 2) The radiation image conversion panel of Structure 1, wherein the support has thereon a thermoplastic resin layer.

(Structure 3) The radiation image conversion panel of Structure 1, wherein the support is composed of a thermoplastic resin containing a carbon fiber.

(Structure 4) The radiation image conversion panel of Structure 1, wherein the stimulable phosphor is represented by the following formula (1).

$$M^1X \cdot aM^2X'_2 \cdot bM^3X''_3 : eA \qquad \text{Formula (1)}$$

where $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen selected from the group consisting of F, Cl, Br and I; A represents a metal selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$.

(Structure 5) The radiation image conversion panel of Structure 1, wherein the thermoplastic resin layer has been subjected to a thermal treatment at a temperature of 140 to 180° C.

(Structure 6) The radiation image conversion panel of Structure 1, wherein the carbon fiber has a fiber diameter of 3 to 20 μm and a fiber length of 6 to 20 mm and is contained in an amount of 0.1 to 50 wt %, based on the thermoplastic resin.

(Structure 7) A method of preparing the radiation image conversion panel having on a support a stimulable phosphor layer and the method comprising:
depositing a stimulable phosphor to grow columnar crystals on the support to form the stimulable phosphor layer, wherein the stimulable phosphor layer possesses columnar crystals of a stimulable phosphor and has a thickness of 50 μm to 1 mm, and the support has thereon a thermoplastic resin layer or is composed of a thermoplastic resin containing a carbon fiber.

(Structure 8) The method of Structure 7, wherein the support has thereon a thermoplastic resin layer.

(Structure 9) The method of Structure 7, wherein the support is composed of a thermoplastic resin containing a carbon fiber.

(Structure 10) The method of Structure 7, wherein the stimulable phosphor is represented by the following formula (1).

$$M^1X \cdot aM^2X'_2 \cdot bM^3X''_3 : eA \qquad \text{(Formula (1))}$$

where $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen selected from the group consisting of F, Cl, Br and I; A represents a metal selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$.

(Structure 11) The method of Structure 7, wherein the thermoplastic resin layer has been subjected to a thermal treatment at a temperature of 140 to 180° C.

(Structure 12) The method of Structure 7, wherein the carbon fiber has a fiber diameter of 3 to 20 μm and a fiber length of 6 to 20 mm and is contained in an amount of 0.1 to 50 wt %, based on the thermoplastic resin.

DETAILED DESCRIPTION OF INVENTION

The present invention will be explained further in detail as described below. One feature of the present invention concerns a support having thereon a thermoplastic resin layer:

It is important to control a change in a degree of vacuum for improving a crystalline form with a CsBr deposition and to prepare the CsBr film on a support evenly.

But, it was difficult to control a change in a degree of vacuum in a CsBr phosphor deposition process if there are present moisture or volatile ingredients during the deposition on the surface of the support having a thermoplastic resin.

In one preferred embodiment, accordingly, the change in a degree of vacuum was eliminated by a heat treatment which took place simultaneously when the aforementioned thermoplastic resin layer is provided on a support and a CsBr phosphor film is deposited on the surface of the thermoplastic resin film. As a result, a CsBr phosphor film can be evenly prepared on a support having a thermoplastic resin film.

Whether a CsBr phosphor film is evenly deposited on a support or not can be determined with an ICP analysis by calculating the amount of activator contained in a CsBr phosphor film. The thermoplastic resin layer is preferably subjected to a heat treatment at a temperature of 140 to 180° C:

It is understood that a surface condition of the base material and an adhesion with a sealing film are better when a heat treatment temperature for a thermoplastic resin prepared on a support is higher and there is no problem in use if the surface of thermoplastic resin film on a support is heated at not more than 180° C.

A thermoplastic resin layer can be provided on a support by preparing a coating solution comprised of a thermoplastic resin, for example, as described below to form a thermoplastic resin layer on the support.

A thickness of the thermoplastic resin layer is preferably 0.1 to 20 μm and is more preferably 1 to 12 μm.

Thermoplastic resins in the present invention will be explained.

The glass transition point of thermoplastic resins which can be used in the present invention is 30 to 150° C. and is preferably 50 to 120° C. Examples thereof include polycarbonate, polyacrylonitrile, polystyrene, polyacrylic ester copolymer, polyvinyl alcohol, polymetaacrylic acid, polyvinylchloride-vinyl acetate copolymer, polyethylene-ethyl acetate copolymer, polyvinylchloride, polyvinylidene chloride, polyvinyl acetate, polyester, polyamide, polyether, silicone, polybutadiene, styrene-butadiene copolymer, ABS elastomer, acrylonitrile butadiene copolymer, polyurethane, silicone-acryl copolymer, acryl-modified fluororesin, and so forth.

Random copolymers, block copolymers, graft copolymers, and so forth which copolymerized those polymer compounds with each other are also included.

Thermoplastic resins in which monomers possessing a vinyl group are polymerized or preferred. Preferable monomers given here are acrylonitrile, styrene, acrylate compounds (acrylic acid, methylacrylate, ethylacrylate, butylacrylate, 2-hydroxyethylacrylate, 2-ethylhexylacrylate, glycidylacrylate, methacrylic acid, methylmethacrylate, butylmethacrylate), vinyl acetate, polyvinyl alcohol, butadiene, vinyl chloride, and polyvinylidene chloride. Copolymers which combined two or more monomers shown above are preferable. Silicone-acryl copolymer, polyurethane, and thermoplastic resins for which a part or all of vinyl acetates lead to vinyl alcohols in saponification of vinyl acetates combined with copolymers are also used preferably.

Polycarbonate, polyester, and polyurethane resins are also used preferably.

It is preferable that thermoplastic resins used in the present invention be optimally cross-linked.

In the case of obtaining polymers through various known techniques, for example, a radical polymerization of styrene acrylic ester and so forth, a process of polymerization may take place after an appropriate amount of a cross-linking agent with two or more functional groups such as divinylbenzene, trimethanolpropanetriacrylate, and 1,6-hexanedioldiacrylate was added to prepare thermoplastic resins possessing cross-linking agents.

In the case of condensation polymers such as polyester, or polyurethane, a condensation reaction may be performed, using an alcohol compound with 3 or more functional groups such as trimethylolpropane and so forth, or an isocyanate with 3 or more functional groups at the time of preparing polyester and polyurethane.

In the present invention, the support is comprised of a thermoplastic resin containing a carbon fiber. The diameter of a carbon fiber is 3–20 μm, the carbon fiber is 6–20 mm long, and 0.1–50 wt % of carbon fiber is contained in the thermoplastic resin though in the case of a carbon staple fiber, a carbon fiber used for a carbon fiber plate is long in length and it is formed as is the case with a fiber sheet for clothes which fibers knitted into.

A mechanical strength and an electrical conductivity were upgraded and an object of the present invention was achieved by using a support in which a staple fiber is incorporated in a thermoplastic resin.

The support whose thickness is preferably 0.9 to 3 mm is prepared by a moulding press after thermoplastic resin pellets and carbon fibers are incorporated at a specified ratio and are melted by heat.

A thermoplastic resin and a carbon fiber are simply incorporated and the carbon fiber is preferable to be evenly scattered in the thermoplastic resin.

Thermoplastic resins given, for example, are polycarbonate, polyacrylonitrile, polystyrene, polyacrylic ester copolymer, polyvinyl alcohol, polymetaacrylic acid, polyvinylchloride-vinyl acetate copolymer, polyethylene-ethyl acetate copolymer, polyvinyl chloride, polyvinylidene chloride, polyvinyl acetate, polyester, polyamide, polyether, silicone, polybutadiene, styrene-butadiene copolymer, ABS elastomer, acrylonitrile butadiene copolymer, polyurethane, silicone-acryl copolymer, acryl-modified fluororesin, acrylonitrile, butadiene, thermoplastic resin made of styrene (ABS), polypropylene resin (PP), polyacetal resin (POM), polyphenylene ether resin (PPE), polybutylene terephthalate resin (PBT), polyamide resin (PA), liquid crystal polyester resin (LCP), polyphenylene sulfide resin (PPS), polyether sulfone resin (PES), polyetherimide resin (PEI), and so forth.

In this invention, there is provided a support of which electrical conductivity is enhanced to reduce adhesion of foreign material:

A surface property of a support is of considerable importance in order to obtain an even crystalline growth in CsBr deposition film. There appears an image degraded by an abnormal crystalline growth caused by an adherent material and occurrence of peel-off caused by disarranging neighboring phase boundaries. If the light reflectance or absorbance of an adherent material is different from those of the surface of a support, a luminance unevenness influenced by even a small amount of adherent material which does not affect any crystal appears and the evenness is degraded. It became possible to prevent adherent material on a support from being electrostatically attached and the degradation of an image was significantly decreased by incorporating a carbon staple fiber in order to enhance electrical conductivity of a base plate.

Incorporation of a carbon staple fiber eliminates troubles which occurred in a deposition process.

Increased incorporation of a carbon staple fiber results in further enhanced electrical conductivity, 10 wt % or more incorporation in resin is preferable and 10–30 wt % of incorporation in resin is more preferable. In the case of mixing 50 wt % or more incorporation, protruded irregularities on the surface of a support appear increasingly and unevenness in the range of high frequency has increased.

In this invention, there was provided a support for which mechanical properties were enhanced:

A bending stress relative to mass of an amount of phosphor deposited on a support and the size of a support occurs when a phosphor layer is deposited by an evaporation process. It is therefore necessary to increase uniformity in film thickness by increasing a degree of rigidity of a support to maintain a planarity.

Incorporation of a carbon stable fiber enhances a mechanical strength. The fiber content of at least 10 wt % results in enhanced mechanical bending strength, and the content of at least 20 wt % leads to a mechanical bending strength of 2000 kg/cm$^2$ or more.

Next, the stimulable phosphor is preferably represented by formula (1) described earlier will be detailed.

$$M^1X \cdot aM^2X'_2 \cdot bM^3X''_3 : eA \qquad \text{Formula (1)}$$

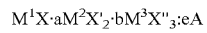

In the formula (1), $M^1$ is at least one alkali metal atom selected from the group consisting of Li, Na, K, Rb and Cs, preferably at least one alkali metal atom selected from Rb and Cs atoms, and more preferably Cs atom.

$M^2$ represents a divalent metal selected from the group consisting of Be, Mg, Ca, Sr, Ba, Zn, Cd, Cu and Ni. Of these, a divalent metal selected from the group consisting of Be, Mg, Ca, Sr, and Ba is preferred.

$M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga. Of these, a trivalent metal selected from the group consisting of Y, Ce, Sm, Eu, Al, Gd, Lu, Ga and In is preferred.

A represents at least one metal selected from the group consisting of Eu, Tb, In, Ce, Tm, Dy, Pr, Ho, Nd, Yb, Er, Gd, Lu, Sm, Y, Tl, Na, Ag, Cu and Mg.

X, X' and X" are each at least one halogen atom selected from the group consisting of F, Cl, Br and I, preferably at least one halogen atom selected from F, Cl and Br, and more preferably at least one halogen atom selected from Br and I in terms of enhancing stimulated emission of a stimulable phosphor.

The stimulable phosphor represented by formula (1) can be prepared, for example, in the following manner.

First, an acid (HI, HBr, HCl or HF) is added to a carbonate so as to form a composition of a phosphor raw material described below and after mixed with stirring, the mixture is filtered at a point of neutralization, and the filtrate was evaporated to obtain crystals having the following composition.

As phosphor raw material, at least one compound selected from the following group (a) is used.

(a) NaF, NaCl, NaBr, NaI, KF, KCl, KBr, KI, RbF, RBCl, RbBr, RbI, CsF, CsCl, CsBr, and CsI.

At least one compound selected from the following group (b) is used.

(b) $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$.

(c) In the forgoing formula (1), a compound having a metal atom selected from each atom such as Eu, Tb, In, Cs, Ce, Tm, Dy, Pr, Ho, Nd, Yb, Er, Gd, Lu, Sm, Y, Tl, Na, Ag, Cu and Mg is used.

(d) As an activator, at least one metal atom selected from each atom such as Eu, Tb, In, Cs, Ce, Tm, Dy, Pr, Ho, Nd, Yb, Er, Gd, Lu, Sm, Y, Tl, Na, Ag, Cu, and Mg is used.

In the formula (1), "a" is $0 \leq a < 0.5$ and preferably $0 \leq a < 0.01$; "b" is $0 \leq b < 0.5$, and preferably $0 \leq b \leq 0.01$; "e" is $0 < e \leq 0.2$, and preferably $0 < e \leq 0.1$.

Phosphor raw materials, which have been selected from the foregoing (a) to (d) so as to have mixing composition meeting the numerical range, as defined in this invention are weighed and dissolved in pure water.

In this regard, there may be conducted sufficient mixing using a mortar, ball mill or mixer mill.

Next, a prescribed amount of an acid is added to adjust a pH value of C in the thus obtained solution so as to fall within the range of $0 < C < 7$, and then any water is vaporized.

Further, the obtained raw material mixture is charged into a heat-resistant vessel such as a silica port, an alumina crucible or a silica crucible and then placed in an electric furnace to be calcined. The calcination temperature preferably is 500 to 1000° C. The calcination time, depending on a charging amount of raw materials, calcination temperature and the like, preferably is 0.5 to 6 hrs.

As a calcinations atmosphere is employed a weakly reducible atmosphere such as a nitrogen gas atmosphere containing a small amount of hydrogen gas or a carbon dioxide atmosphere containing carbon monoxide, a nitrogen gas atmosphere, a neutral atmosphere such as an argon gas atmosphere, or a trace amount of oxygen-introduced weakly oxidizing atmosphere.

After completion of calcination under the foregoing condition, calcined material is taken out of the electric furnace and subjected to pulverization. Thereafter, powdery calcined material may again be charged into a heat resistant vessel and then placed in an electric furnace to be calcined under the foregoing condition to further enhance emission luminance of the phosphor. When the calcined material is allowed to cool from calcination temperature to room temperature, the intended phosphor can be obtained by being taken out the calcined material from an electric furnace and allowing it to stand in an aerial atmosphere. In this regard, the calcined material may be cooled in the same atmosphere as in the calcination, such as a weakly reducing atmosphere or neutral atmosphere. Alternatively, the calcined material is moved from a heating section to a cooling section within the electric furnace, followed by being rapidly cooled in a weakly reducing atmosphere, neutral atmosphere or weakly oxidizing atmosphere, thereby leading to further enhanced stimulated emission luminance of the phosphor.

The stimulable phosphor layer in the present invention is formed by a vapor-phase growth process.

A vacuum evaporation method, a sputter-deposition method, a CVD method, ion plating method and other methods can be employed to allow the stimulable phosphor to undergo vapor-phase growth.

The foregoing methods are conducted in the manner described below.

Vacuum evaporation is conducted in such a manner that after placing a support in an evaporation apparatus, the inside of the apparatus is evacuated to a vacuum degree of $1.333 \times 10^{-4}$ Pa.

Subsequently, at least a stimulable phosphor is evaporated with heating by the resistance heating method or electron-beam method to cause the phosphor to be deposited at a slant on the surface of the support to a desired thickness.

As a result, a stimulable phosphor layer containing no binder is formed, provided that the foregoing evaporation stage may be divided into plural times to form the stimulable phosphor layer.

In this evaporation stage, plural resistance heaters or electron beams may be used to perform vacuum evaporation. Alternatively, raw material of a stimulable phosphor is evaporated using plural resistance heaters or electron beams and the intended stimulable phosphor is synthesized on the support, simultaneously forming a stimulable phosphor layer.

After completion of vapor evaporation, a radiation image conversion panel of this invention can be prepared by optionally providing a protective layer on the opposite side of the stimulable phosphor layer to the support. In addition, a procedure of employing a support may be conducted after forming the stimulable phosphor layer on a protective layer.

Vacuum evaporation may be conducted while cooling or heating the substrate (support, protective layer, or intermediate layer) optionally to be deposited thereon.

After completion of vacuum evaporation, the stimulable phosphor layer may be subjected to a heating treatment. In vapor evaporation, a gas such as $O_2$ or $H_2$ may optionally be introduced to perform reactive vapor evaporation.

Sputter deposition, as is the case with vacuum deposition, is conducted in such a manner that after setting a support having a protective layer or an intermediate layer in a sputtering apparatus, the inside of the apparatus is evacuated to a vacuum level of $1.333 \times 10^{-4}$ Pa and then inert gas used for sputtering such as Ar and Ne is introduced therein at a gas pressure of ca. $1.333 \times 10^{-1}$ Pa, subsequently, sputtering is carried out with targeting the stimulable phosphor to cause the phosphor to be deposited on the slanted surface of the support so as to have a desired thickness.

Similarly to the vacuum evaporation, various treatments may be applied.

Further, there are also applicable the CVD method and ion plating method.

The growth rate of a stimulable phosphor layer in the vapor-phase growth preferably is 0.05 to 300 μm/min. A growth rate of less than 0.05 μm/min results in lowered productivity of the radiation image conversion panel of this invention and is not preferable. In the case of a growth rate of more than 300 μm/min, it is difficult to control the growth rate and is not suitable.

A radiation image conversion panel which has been prepared by the vapor evaporation method or sputter deposition method contains no binder, leading to increased filling density of the stimulable phosphor layer and thereby a radiation image conversion panel with enhanced sensitivity and sharpness can be obtained.

A thickness of the stimulable phosphor layer, depending on the intended use of the radiation image conversion panel and the kind of stimulable phosphor, preferably is 50 μm to 1 mm, more preferably 50 to 300 μm, still more preferably 100 to 300 μm, and optimally 150 to 300 μm.

In the formation of a stimulable phosphor layer by the vapor-phase growth process, a support on which the stimulable phosphor layer is to be formed, is preferably heated at a temperature of 100° C. or higher, more preferably 150° C. or higher, and still more preferably 150 to 400° C.

The reflectance of a stimulable phosphor layer preferably is 20% or more, more preferably 30% or more, and still more preferably 40% or more, with an upper limit of 100%.

Further, spacing between columnar crystals may be filled with a filler such as a binder to strengthen the phosphor layer. Furthermore, material exhibiting relatively high light absorbance or high reflectance may be used as filler. The use thereof prevents lateral diffusion of stimulating light entering the phosphor layer, in addition to the foregoing strengthening effect.

The stimulable phosphor layer formed on the support contains no binder, leading to superior directionality and enhanced directionality of stimulating light and stimulated luminescence and enabling formation of a thicker phosphor layer, as compared to radiation image conversion panel having a dispersion-type stimulable phosphor layer, in which a stimulable phosphor is dispersed in a binder. Moreover, reduced scattering of stimulating light in the stimulable phosphor layer results in enhanced sharpness.

Material exhibiting high reflectance refers to one exhibiting a high reflectance with respect to stimulating light (500 to 900 nm, specifically 600 to 800 nm), including metals such as aluminum, magnesium, silver and indium, white pigments and colorants ranging green to red.

White pigments can also reflect stimulating light. Examples thereof include $TiO_2$ (anatase type, rutile type.), MgO, $PbCO_3$, $Pb(OH)_2$, $BaSO_4$, $Al_2O_3$, M(II)FX [in which M(II) is at least one of Ba, Sr and Ca, X is at least one of Cl and Br], $CaCO_3$, ZnO, $Sb_2O_3$, $SiO_2$, $ZrO_2$, lithopone ($BaSO_4 \cdot ZnS$), magnesium silicate, basic silisulfate, basic lead phosphate, and aluminum silicate.

These white pigments exhibit high covering power and have a refractive index high, whereby stimulated luminescence is easily scattered through reflection or refraction, leading to enhanced sensitivity of the radiation image conversion panel.

Examples of material exhibiting high light absorbance include carbon, chromium oxide, nickel oxide, iron oxide, and blue colorants. Of these, carbon absorbs stimulated luminescence.

Colorants may be any organic or inorganic colorants.

Examples of organic colorants include Zapon Fastblue 3G (produced by Hoechst A. G.), Estrol Brillblue N-3RL (produced by Sumitomo Chemical Ind. Co. Ltd.), D6CBlue No. 1 (produced by National Aniline Co.), Spirit Blue (produced by HODOGAYA KAGAKU Co., Ltd.), Oilblue No. 603 (produced by Orient Co., Ltd.), Kiton Blue A (produced by Chiba Geigy Co.), Aisen Catironblue GLH (produced by HODOGAYA KAGAKU Co., Ltd.), Lakeblue AFH (produced by KYOWA SANGYO Co., Ltd.), Primocyanine 6GX (produced by INAHATA SANGYO o. Ltd.), Briilacid Green 6BH (produced by HODOGAYA KAGAKU Co., Ltd.), Cyanblue BNRCS (produced by Toyo Ink Co., Ltd.), and Lyonoyl Blue SL (produced by Toyo Ink Co., Ltd.).

There are also cited organic metal complex colorants such as Color Index 24411, 23160, 74180, 74200, 22800, 23154, 23155, 24401, 14830, 15050, 15760, 15707, 17941, 74220, 13425, 13361, 13420, 11836, 74140, 74380, 74350 and 74460.

Examples of inorganic colorants include ultramarine, cobalt blue, celureun blue, chromium oxide, and $TiO_2$—ZnO—NiO type pigments.

The stimulable phosphor layer may be provided thereon with a protective layer.

The protective layer may be formed by coating a coating composition for the protective layer on the stimulable phosphor layer or the protective layer which was previously prepared may be adhered to the support. Alternatively, a procedure of forming a stimulable phosphor layer on the protective layer which was previously prepared is also applicable.

Materials used for the protective layer include those which are usually used for protective layers. Examples thereof include cellulose acetate, nitrocellulose, polymethyl methacrylate, polyvinyl butyral, polyvinyl formal, polycarbonate, polyester, polyethylene terephthalate, polyethylene, polyvinylidene chloride, nylon, polytetrafluoroethylene, polytrifluoroethylene, copolymer of terafluoroethylene and hexafluoropropylene, copolymer of vinylidene chloride and vinyl chloride, and copolymer of vinylidene chloride and acrylonitrile. Further, a transparent glass substrate may be used as a support.

Furthermore, inorganic material such as SiC, $SiO_2$, SiN, and $Al_2O_3$ may be allowed to deposit and laminate by means of the vacuum evaporation or sputtering method to form the protective layer.

The thickness of a protective layer is preferably 0.1 to 2,000 μm.

FIG. 1 illustrates a constitution of a radiation image conversion panel of this invention.

In FIG. 1, the numeral 21 designates a radiation generating apparatus, 22 designates an object, 23 designates a radiation image conversion panel having a visible- or infrared-stimulable phosphor layer, 24 designates a stimulating light source to cause a latent image stored in the radiation image conversion panel 23 to be emitted as stimulated luminescence, 25 designates a photoelectric conversion apparatus to detect the stimulated luminescence emitted from the radiation image conversion panel 23, 26 designates an image reproduction apparatus to reproduce photoelectric conversion signals detected in the photoelectric conversion apparatus 25 in the form of an image, 27 designates a display apparatus to display reproduced images, and 28 designates a filter for reflected light from a light source 24 to allow only light emitted from the radiation image conversion panel 23 to pass therethrough.

FIG. 1 shows an example of obtaining a transmission-type radiation image, and in cases where the object 22 itself radiates radiation, radiation generation apparatus 21 may not be required.

An apparatus subsequent to the photoelectric conversion 25 apparatus may be any one that is capable of reproducing light information from the radiation image conversion panel 23, in any image form.

As shown in FIG. 1, when the object 22 is arranged between the radiation generation apparatus 21 and the radiation image conversion panel 23, and exposed to radiation R, the radiation R transmits the respective portions of the object 22 in accordance with radiation transmittance thereof and the resulting transmission image RI, i.e., an image having different radiation intensities enters the radiation image conversion panel 23.

The thus entered transmission image RI is absorbed in a stimulable phosphor layer of the radiation image conversion panel 23, in which electrons and/or holes are generated in proportion to the dose of the absorbed radiation and accumulated at a trap level of the stimulable phosphor.

A latent image accumulating energies of the radiation transmission image is formed. Subsequently, the latent image is excited with light energy to form an actual image.

The stimulated phosphor layer is irradiated with the light source 24 irradiating visible or infrared light to eject the electrons and/or holes accumulated on the trap level to emit the accumulated energy in the form of stimulated luminescence.

The intensity of the emitted luminescence is proportional to the number of accumulated electrons and/or holes, that is, energy of the radiation absorbed in the stimulable phosphor of the radiation image conversion panel 23. The thus obtained light signals are converted to electric signals by the photoelectric conversion 25 apparatus such as a photomultiplier, which are reproduced as an image in image processor 26, displaying the image in image display apparatus 27.

As the image processor 26, it is effective to employ one which not only reproduces the electric signals as the image signal but one which can also conduct image processing, computation, memory and storage of the image.

The stimulated luminescence emitted from the stimulable phosphor layer, having a spectral distribution in the shorter wavelength region is preferable, based on the reason that the stimulated luminescence emitted from the stimulable phosphor layer is required to be separated from the reflected stimulating light and photoelectric converters to receive the luminescence emitted from the stimulable phosphor layer, in general, are provided with a sensor having higher sensitivity to light energy of 600 nm or less in short wave length.

Emission of stimulable phosphors relating to the invention falls within the wavelength region of 300 to 500 nm and the stimulating light wavelength is 500 to 900 nm, satisfying the foregoing conditions. Further, along with a recent trend of down-sizing diagnostic apparatuses, semiconductor lasers which exhibit a higher output and are capable of being further down-sized are preferably employed for use in reading images of the radiation image conversion panel. The semiconductor laser has a wavelength of 680 nm and the stimulable phosphor used in the radiation image conversion panel of the invention exhibits extremely superior sharpness when using a stimulating light of 680 nm.

Thus, the stimulable phosphors relating to the invention emit luminescence having a main peak at 500 nm or less, which is easily separable from the stimulating light and compatible with spectral sensitivity of the receiver, leading to enhanced light-receiving efficiency and enhanced sensitivity of an image receiving system.

Light sources including the stimulating wavelength for the stimulable phosphor used in the radiation image conversion panel 23 are used as the stimulating light source 24. Specifically, the use of laser light simplifies an optical system and leads to enhanced stimulating light intensity, resulting in preferable performance.

Examples of the laser include an He—Ne laser, He—Cd laser, Ar ion laser, Kr laser, $N_2$ laser, YAG laser and its second harmonic wave, ruby laser, semiconductor laser, various dye lasers, and metal vapor lasers such as a copper vapor laser. Of these, continuous oscillation lasers such as an He—Ne laser and an Ar ion laser are usually desirable, and pulse-oscillated lasers are also usable by synchronizing the pulse with a scanning time for one pixel of the panel.

In cases when employing retarded emission for separation, instead of using the filter 28, the use of the pulse-oscillated laser is preferable rather than modulation of the continuous oscillation laser, as described in JP-A No. 59-22046.

Of the various laser light sources described above, semiconductor lasers are specifically preferred in terms of being compact, inexpensive and not requiring a modulator.

The filter 28 cuts reflected stimulating light and allows the stimulated luminescence emitted from the radiation image conversion panel 23 to transmit, which is determined by the combination of the stimulated emission wavelength of a stimulable phosphor contained in the radiation image conversion panel 23 and the stimulating light source 24.

In the preferred practical combination of a stimulating light wavelength of 500 to 900 nm with a stimulated emission wavelength of 300 to 500 nm, for example, violet to blue glass filters are used, such as C-39, C-40, V-40, V-42 and V-44 (available from TOSHIBA CORP.), 7-54 and 7-59 (available from Corning Co.), BG-1, BG-3, BG-25, BG-37 and BG-38 (available from Spectrofilm Co.). Interference filters are usable by selecting specific filters. The photoelectric conversion apparatus (25) usable in the invention includes any one capable of converting variation of luminous energy to electric signal, such as a photoelectric tube, a photomultiplier, a photodiode, a phototransistor, a solar cell, and photoconductive elements.

EXAMPLE A

The present invention will be further described based on examples but embodiments of the invention is by no means limited to these examples.

Preparation of Radiation Image Conversion Panel Samples 1–8 (Comparative Examples 1–and Examples 1–6 in Table 1)

Figure 2:
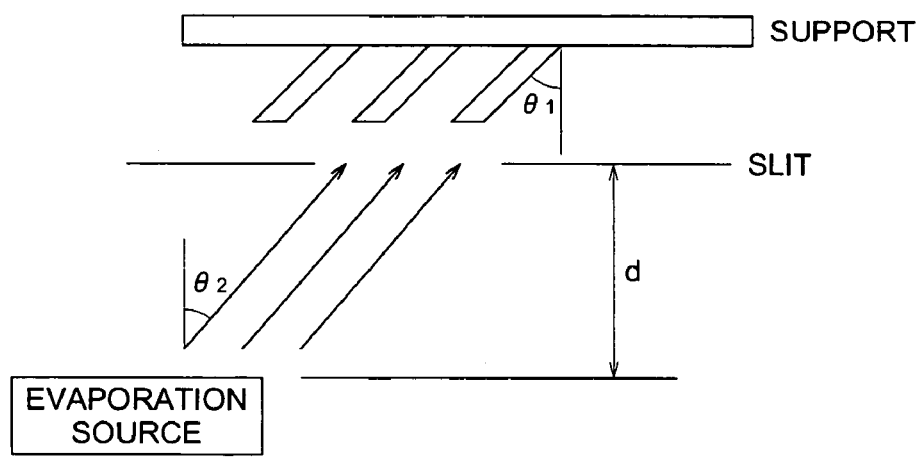
FIG. 2 illustrates formation of a stimulable phosphor layer by vapor deposition.

According to the condition shown in Table 1, an aluminum film of 10 μm in thickness was prepared on a 200 μm thick crystallized glass support (produced by Nippon Denki Glass Co., Ltd.) and a stimulable phosphor layer containing stimulable phosphor (CsBr:Eu), using a vacuum evaporation apparatus as shown in FIG. 2 (in which $\theta_1=5°$ and $\theta_2=5°$ were respectively set) was formed on the surface of the aluminum film.

In the vacuum evaporation apparatus, the phosphor was introduced using an aluminum slit at a distance d of 60 cm between a slit and a support with transporting the support in the parallel direction to form a 300 μm thick stimulable phosphor layer.

In the vacuum evaporation, the support was set in the evaporation chamber of an evaporator and then, phosphor raw material as an evaporation source (CsBr:Eu), which was previously molded in a press, was put into a water-cooled crucible.

Thereafter, the inside of the evaporator was evacuated and after introducing $N_2$ gas to adjust a degree of vacuum of 0.133 Pa, vacuum evaporation was conducted to perform vapor deposition, while maintaining the support temperature (also called substrate temperature) at 350° C. The vapor deposition was completed when the thickness of the stimulable phosphor layer reached 300 μm and then, the phosphor layer was subjected to a heating treatment at 400° C. Peripheral portions of the support and a protective layer comprised of borosilicate glass were sealed with an adhesive in a dry aerial atmosphere to prepare a radiation image conversion panel sample 1, comprising a phosphor layer having a shielded structure.

A radiation image conversion panel sample of comparative example 2 was prepared, similarly to radiation image conversion panel sample 1 (comparative example 1), except that an aluminum film of 5 μm in thickness was formed on a support. Similarly to radiation image conversion panel sample 1 (comparative example 1), radiation image conversion panel samples 3–8 (examples 1–6 in Table 1) were also prepared, except that a coating solution of a thermoplastic resin was prepared using a thermoplastic resin, as shown in Table 1, and coated on the support so as to form a 10 μm thick thermoplastic layer, while heating at a temperature, as shown in Table 1.

Each sample was evaluated in the manner described below.

Evaluation of Luminance and Luminance Distribution

Samples were each evaluated with respect to luminance, using Regius 350, trade name, produced by Konica Minolta Medical & Graphic, Inc.

Thus, similarly to the foregoing sharpness evaluation, radiation image conversion panel samples were each exposed to X-rays of a tungsten bulb at 80 kVp and 10 mAs and at a distance an X-ray source and the sample plate, and thereafter, the sample plate was set on the Regius 350 and read. Evaluation was made from electric signals obtained by a photomultiplier.

Distribution of electric signals within the exposed panel plate, obtained from the photomultiplier was evaluated. Thus, a standard deviation of the luminance distribution was determined for each panel sample (which was also denoted simply as S.D.). The less value indicates superior homogeneity of an activator.

Evaluation of Sharpness

Modulation transfer function (MTF) was determined for each of the radiation image conversion panel samples to evaluate sharpness.

Thus, after a CTF chart was adhered to the respective radiation image conversion panels, each of the panels was exposed at 10 mR of 80 kVp X-rays (at a distance to the object: 1.5 m). Thereafter, sample were each scanned with a semiconductor laser light beam (690 nm, a power of 40 mW on the panel) of 100 μm diameter to read it. As shown in Table 1, MTF values (sharpness) of the respective panels were represented by the sum of the MTF values at 2.0 lp/mm.

TABLE 1

| Sample | Surface film of the base material | Heat treatment temperature | Luminance | MTF (%) (21 p/mm) | Luminance distribution |
|---|---|---|---|---|---|
| Comparative Example 1 | Al | — | 0.51 | 13 | 44 |
| Comparative Example 2 | Al | — | 0.42 | 11 | 65 |
| Example 1 | PC | 140 | 1.22 | 39 | 8 |
| Example 2 | PC | 160 | 1.43 | 40 | 12 |
| Example 3 | PC | 180 | 1.54 | 42 | 6 |
| Example 4 | PC | 200 | 1.33 | 21 | 24 |
| Example 5 | PC | 250 | 1.56 | 22 | 23 |
| Example 6 | PES | 160 | 1.65 | 48 | 4 |

Al: Aluminum
PC: Polycarbonate
PES: Polyester

As can be seen from Table 1, it was proved that inventive samples led to superior results.

EXAMPLE B

The present invention will be further described based on examples but embodiments of the invention is by no means limited to these examples.

Preparation of Radiation Image Conversion Panel Samples 1–15

According to the condition shown in Table 2, a stimulable phosphor layer containing stimulable phosphor (CsBr:Eu), using a vacuum evaporation apparatus as shown in FIG. 2 (in which $\theta_1=5°$ and $\theta_2=5°$ were respectively set) was formed on the surface of a 1 mm thick crystallized glass support (produced by Nippon Denki Glass Co., Ltd.).

In the vacuum evaporation apparatus shown in FIG. 2, the phosphor was introduced using an aluminum slit at a distance d of 60 cm between a slit and a support with transporting the support in the parallel direction to form a 300 μm thick stimulable phosphor layer.

In the vacuum evaporation, the support was set in the evaporation chamber of an evaporator and then, phosphor raw material as an evaporation source (CsBr:Eu), which was previously molded in a press, was put into a water-cooled crucible.

Thereafter, the inside of the evaporator was evacuated and after introducing $N_2$ gas to adjust a degree of vacuum of 0.133 Pa, vacuum evaporation was conducted to perform vapor deposition, while maintaining the support temperature (also called substrate temperature) at 350° C. The vapor deposition was completed when the thickness of the stimulable phosphor layer reached 300 μm and then, the phosphor layer was subjected to a heating treatment at 400° C. Peripheral portions of the support and a protective layer comprised of borosilicate glass were sealed with an adhesive in a dry aerial atmosphere to prepare a radiation image conversion panel sample 1, comprising a phosphor layer having a shielded structure.

Radiation image conversion panel samples 2–15 (comparative sample 2 and examples 1–13 in Table 2) were prepared by using a support having a thermoplastic resin incorporating a carbon staple fiber with the ratios described in Table 2 as a support, similarly to radiation image conversion panel sample 1 (comparative example 1), except that a protective layer with an evaporation process in a heat treatment at temperature described in Table 2 was prepared.

Evaluation of Luminance and Luminance Distribution

Samples were each evaluated with respect to luminance, using Regius 350, trade name, produced by Konica Minolta Medical & Graphic, Inc.

Thus, similarly to the foregoing sharpness evaluation, -radiation image conversion panel samples were each exposed to X-rays of a tungsten bulb at 80 kVp and 10 mAs and at a distance an X-ray source and the sample plate, and thereafter, the sample plate was set on the Regius 350 and read. Evaluation was made from electric signals obtained by a photomultiplier.

Distribution of electric signals within the exposed panel plate, obtained from the photomultiplier was evaluated. Thus, a standard deviation of the luminance distribution was determined for each panel sample (which was also denoted simply as S.D.). The less value indicates superior homogeneity of an activator.

Evaluation of Sharpness

Modulation transfer function (MTF) was determined for each of the radiation image conversion panel samples to evaluate sharpness.

Thus, after a CTF chart was adhered to the respective radiation image conversion panels, each of the panels was exposed at 10 mR of 80 kVp X-rays (at a distance to the object: 1.5 m). Thereafter, sample were each scanned with a semiconductor laser light beam (690 nm, a power of 40 mW on the panel) of 100 μm diameter to read it. MTF values (sharpness) of the respective panels were represented by the sum of the MTF values at 2.0 lp/mm.

Results obtained are shown in Table 2.

TABLE 2

| Sample | Support Type of resin | Carbon staple fiber ratio (wt %) | Luminance | MTF (21 p/mm) | Luminance distribution S.D. | Remark |
|---|---|---|---|---|---|---|
| 1 | PC | 0 | 0.51 | 13% | 44 | Comparative example 1 |
| 2 | PC | 80 | 0.42 | 11% | 65 | Comparative example 2 |
| 3 | PC | 40 | 1.12 | 33% | 12 | Example 1 |
| 4 | ABS | 20 | 1.24 | 32% | 14 | Example 2 |
| 5 | PP | 20 | 1.22 | 34% | 8 | Example 3 |
| 6 | PC | 20 | 1.32 | 42% | 15 | Example 4 |
| 7 | POM | 20 | 1.33 | 44% | 10 | Example 5 |
| 8 | PPE | 20 | 1.42 | 40% | 9 | Example 6 |
| 9 | PBT | 20 | 1.33 | 41% | 11 | Example 7 |
| 10 | PA | 20 | 1.22 | 39% | 8 | Example 8 |
| 11 | LCP | 20 | 1.43 | 40% | 12 | Example 9 |
| 12 | PPS | 20 | 1.54 | 42% | 6 | Example 10 |
| 13 | PES | 20 | 1.33 | 21% | 14 | Example 11 |
| 14 | PEEK | 20 | 1.56 | 22% | 13 | Example 12 |
| 15 | PEI | 20 | 1.65 | 48% | 4 | Example 13 |

PC: polycarbonate resin
ABS: thermoplastic resin made of acrylonitrile, butadiene, and styrene
PP: polypropylene resin
POM: polyacetal resin
PPE: polyphenylene ether resin
PBT: polybutylene terephthalate resin
PA: polyamide resin
LCP: liquid crystal polyester resin
PPS: polyphenylene sulfide resin
PES: polyethersulfone resin
PEI: polyetherimide resin As is clear from Table 2, data obtained in examples of the present invention are superior to those in comparative examples.

EFFECT OF THE INVENTION

According to the present invention, there are provided a radiation image conversion panel exhibiting superior homogeneity of an activator in a phosphor layer and enhanced luminance and sharpness, and a preparation method of the same.

What is claimed is:

1. A radiation image conversion panel comprising on a support a stimulable phosphor layer,
   wherein the stimulable phosphor layer comprises columnar crystals of a stimulable phosphor and has a thickness of 50 pm to 1 mm, and the support comprises a thermoplastic resin containing a carbon fiber in the range of 0.1 to 50 wt. %.

2. The radiation image conversion panel of claim 1, wherein the stimulable phosphor is represented by the following formula (1)

$$M^1X \cdot aM^2X'_2 \cdot bM^3X''_3 : eA \qquad \text{Formula (1)}$$

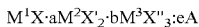

where $M^1$ represents an alkali metal selected from the group consisting of Li, Na, K, Rb and CS; $M^2$ represents a divalent metal selected from the group consisting of Be, Mg, Ca, Sr, Ba, Zn, Cd, Cu and Ni; $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen selected from the group consisting of F, Cl, Br and I; A represents a metal selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$.

3. The radiation image conversion panel of claim 1, wherein the carbon fiber has a fiber diameter of 3 to 20 μm and a fiber length of 6 to 20 mm.

4. The radiation image conversion panel of claim 1, wherein the thermoplastic resin comprises polycarbonate, polyacrylonitrile, polystyrene, a polyacrylic ester copolymer, a polyethylene-ethylacetate copolymer, polybutadiene, acrylonitrile butadiene styrene, a polyacetal resin, a polyphenylene ether resin, a polyamide resin or a liquid crystal polyester resin.

5. A method of preparing a radiation image conversion panel compising on a support a stimulable phosphor layer and the method comprising:
   depositing a stimulable phosphor to grow columnar crystals on the support to form the stimulable phosphor layer,
   wherein the stimulable phosphor layer comprises columnar crystals of a stimulable phosphor and has a thickness of 50 μm to 1 mm, and the support has thereon a thermoplastic resin layer subjected to a thermal treatment at a temperature of 140 to 180° C. or comprises a thermoplastic resin containing a carbon fiber.

6. The method of claim 5,
   wherein the stimulable phosphor is represented by the following formula (1)

$$M^1X \cdot aM^2X'_2 \cdot bM^3X''_3 : eA \qquad \text{Formula (1)}$$

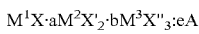

where $M^1$ represents an alkali metal selected from the group consisting of Li, Na, K, Rb and CS; $M^2$ represents a divalent metal selected from the group consisting of Be, Mg, Ca, Sr, Ba, Zn, Cd, Cu and Ni; $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen selected from the group consisting of F, Cl, Br and I; A represents a metal selected from the group consisting of Eu, Tb, In, Ce, Tm, Dy, Pr, Ho, Nd, Yb, Er, Gd, Lu, Sm, Y, Ti, Na, Ag, Cu and Mg; a, b and e are each $0 \leq a < 0.5$, $0 \leq b < 0.5$ and $0 < e \leq 0.2$.

7. The method of claim 5,
   wherein the carbon fiber has a fiber diameter of 3 to 20 μm, a fiber length of 6 to 20 mm and in an amount of 0.1 to 50 wt %, based on the thermoplastic resin.

* * * * *